United States Patent [19]

Hora

[11] Patent Number: 5,156,648

[45] Date of Patent: Oct. 20, 1992

[54] PROP-FAN PITCH-CHANGE MECHANISM

[75] Inventor: Petr Hora, West Chester, Ohio

[73] Assignee: General Electric Company, Cincinnati, Ohio

[21] Appl. No.: 550,009

[22] Filed: Jul. 9, 1990

[51] Int. Cl.$^5$ .............................................. B64C 11/32
[52] U.S. Cl. ...................................... 416/160; 416/129
[58] Field of Search ............... 416/128, 129, 130, 160, 416/162, 170 R; 475/331, 346

[56] References Cited

U.S. PATENT DOCUMENTS

| | | |
|---|---|---|
| 2,541,636 | 2/1951 | Chillson . |
| 2,664,960 | 1/1954 | Longfellow . |
| 3,536,415 | 10/1970 | Kusiak . |
| 3,647,320 | 3/1972 | Chilman . |
| 3,663,119 | 5/1972 | Brooking et al. ............... 416/160 |
| 3,672,788 | 6/1972 | Ellinger . |
| 3,687,569 | 8/1972 | Klompas ............................. 416/160 |
| 3,866,415 | 2/1975 | Ciokajlo . |
| 3,893,789 | 7/1975 | Andrews . |
| 3,910,721 | 10/1975 | McMurtry . |
| 3,912,418 | 10/1975 | Andrews et al. . |
| 3,922,852 | 12/1975 | Drabek . |
| 3,964,839 | 6/1976 | Kusiak . |
| 3,994,128 | 11/1976 | Griswold, Jr. . |
| 4,047,842 | 9/1977 | Avena et al. . |
| 4,521,158 | 6/1985 | Fickelscher . |
| 4,534,524 | 8/1985 | Aldrich . |
| 4,657,844 | 4/1987 | Wakeman et al. . |
| 4,660,374 | 4/1987 | Scott . |
| 4,738,590 | 4/1988 | Butler . |
| 4,738,591 | 4/1988 | Butler . |
| 4,750,862 | 6/1988 | Barnes et al. . |
| 4,968,217 | 11/1990 | Newton ............................. 416/160 |

FOREIGN PATENT DOCUMENTS

| | | |
|---|---|---|
| 58-197499 | 11/1983 | Japan . |
| 531756 | 1/1941 | United Kingdom . |
| 1296063 | 11/1972 | United Kingdom . |
| 2182397 | 5/1987 | United Kingdom . |

OTHER PUBLICATIONS

Article—"A New Design for a Contra-Prop" Aeronautical Engineering.

Primary Examiner—Edward K. Look
Assistant Examiner—James A. Larson
Attorney, Agent, or Firm—Jerome C. Squillaro; John R. Rafter

[57] ABSTRACT

The invention concerns pitch-change mechanisms, of the planetary gear type, for use in aircraft propellers. Planet gears engage three ring gears at different gear ratios, thereby causing relative rotation of the ring gears to occur when the planet gears rotate. A linkage between the ring gears and the propeller blades converts the relative rotation into a change in pitch. A sun gear drives the planet gears. A planet carrier prevents excessive skew of the planets from occurring if one of the ring gears should break, and thereby release its load on the planet gear.

6 Claims, 7 Drawing Sheets

$$\sum M_A:$$
$$289 \cdot (279 + \frac{278}{2}) = 292 \cdot 278$$

LEVER ADVANTAGE:
$$\frac{292}{289} = \frac{279 + \frac{278}{2}}{278}$$

FIG. 15A

PROP-FAN PITCH-CHANGE MECHANISM

CROSS-REFERENCE TO RELATED APPLICATIONS

This application is related to co-pending U.S. patent application Ser. No. 07/556,242, filed Jul. 23, 1990, for an AIRCRAFT PITCH CHANGE MECHANISM, U.S. patent application Ser. No. 07/556,155, filed Jul. 23, 1990, for PITCH CHANGE MECHANISM FOR PROP FANS, and U.S. patent application Ser. No. 07/556,145, filed Jul. 23, 1990, for PITCH CHANGE MECHANISM.

The invention concerns pitch-change mechanisms for aircraft propellers, prop fans, and ducted fans.

BACKGROUND OF THE INVENTION

Figure 1:
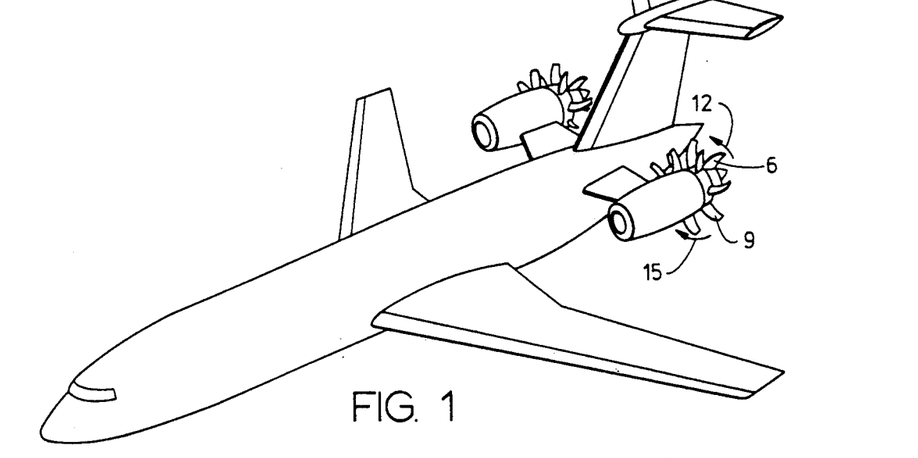
FIG. 1 illustrates an aircraft having propellers with which the invention can be used.
Figure 2:
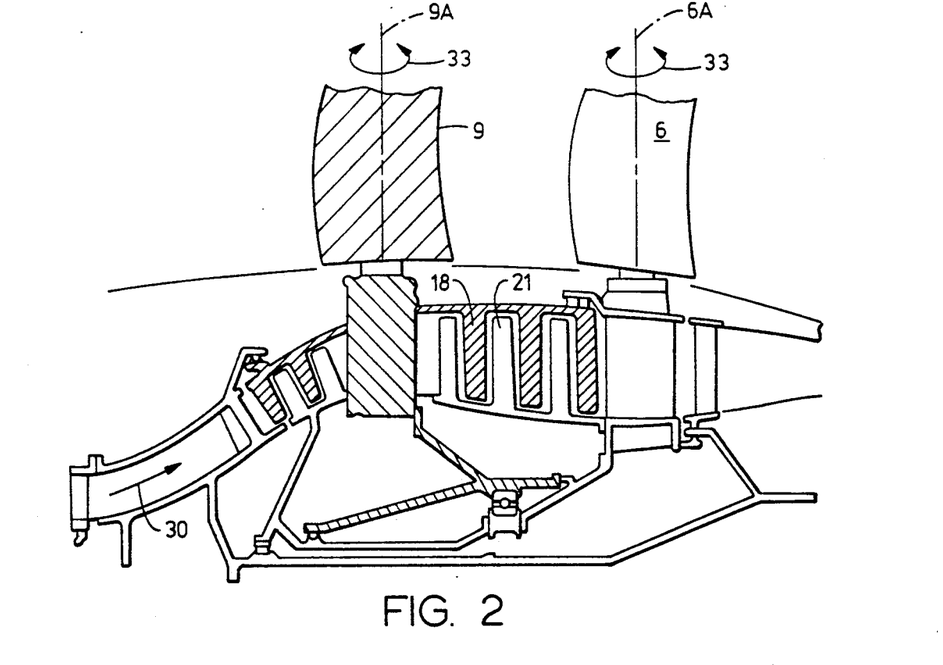
FIG. 2 is a simplified cross-section of a counter-rotating turbine which drives the propellers of FIG. 1.

FIG. 1 illustrates an aircraft powered by counter rotating propellers 6 and 9 of the ultra-high bypass, unducted fan type. The rotational directions are indicated by arrows 12 and 15. FIG. 2 illustrates a type of turbine system which can be used to drive the propellers 6 and 9.

In FIG. 2, fore propeller 9 is attached to a first turbine 18 which rotates in direction 15 as indicated in FIG. 1. The components rotating in this direction are decorated with hatching in FIG. 2. The aft propeller 6 is attached to a second turbine 21 and rotates in direction 12 of FIG. 1. A hot, high-energy gas stream 30 in FIG. 2 provided by a gas generator (not shown) causes rotation of the turbines.

Propeller blades 6 and 9 (which are sometimes called fan blades or propulsor blades in the art) are of the variable pitch type. Variable pitch means that each blade can rotate about a respective pitch axis 6A or 9A in FIG. 2 as indicated by circular arrows 33. A principal reason for changing the pitch is to provide the blades 6 and 9 with the angle of attack which is proper for the present power level of the engine and airspeed of the aircraft.

OBJECTS OF THE INVENTION

It is an object of the present invention to provide an improved pitch change mechanism for aircraft propellers.

SUMMARY OF THE INVENTION

In one form of the invention, a planetary gear set changes pitch of a propeller. The gear set includes a sun gear which drives planet gears, which engage three ring gears. The first and second of the ring gears are movable, and the third is fixed, with respect to the propeller blades. In normal operation, motion of the planet gears causes the first and second ring gears to rotate in opposite relative directions at equal speeds, while rotating in the same direction in an absolute sense. These ring gears together rotate a common gear (attached to the propeller blade) which changes pitch. The third, fixed ring gear balances moments in the planet gears. If one of the three ring gears should break, however, the broken gear does not participate in either balancing the moments or changing pitch: the moments become unbalanced and the other two ring gears operate to change pitch.

DETAILED DESCRIPTION OF THE INVENTION

FIG. 3

Non-Rotating Case

Figure 3:
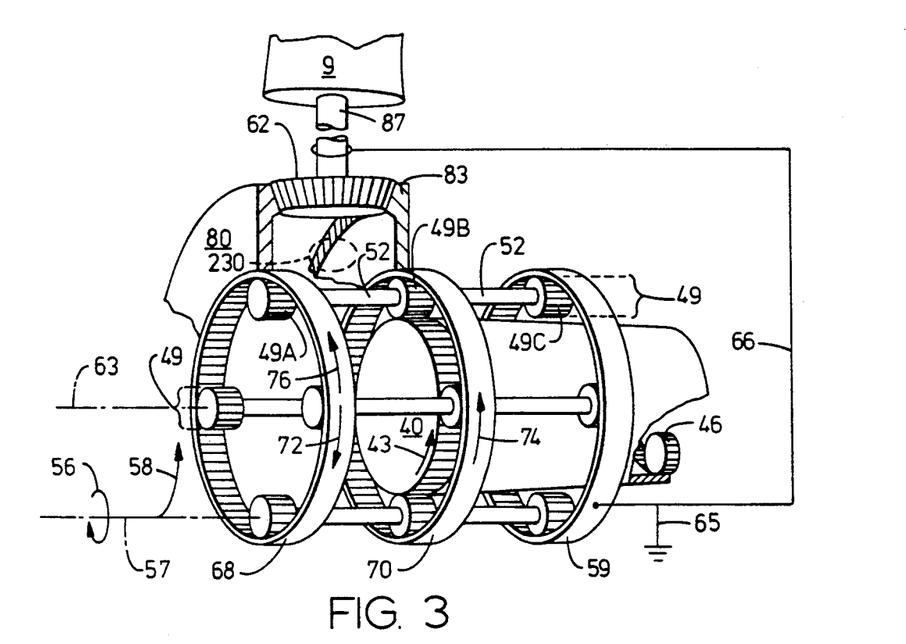
FIG. 3 shows one form of the invention.

FIG. 3 illustrates one form of the invention, but with the gears arranged in a manner which simplifies explanation. It is assumed that the system is at rest: blade 9 is neither rotating nor changing in pitch. Consequently, all components in FIG. 3 are stationary. Changing of pitch of blade 9 will be explained.

Pitch of blade 9 changes when blade bevel gear 62 rotates and causes shaft 87 to rotate. Rotation of the blade bevel gear 62 is caused by rotation of both bevel ring gears 80 and 83 in opposite relative directions: both bevel ring gears 80 and 83 share the load of the blade bevel gear 62. The opposite relative rotation is caused by a planetary system, comprising sun gear 40, planets 49, and ring gears 68 and 70.

The sun gear 40 rotates, for example, in direction 43, and is driven by a pinion gear 46. The sun gear 40 drives planet gears 49. Each planet gear includes a triplet of three sub-planets 49A, 49B, and 49C. There is no relative rotation between any sub-planets of the triplet: each sub-planet is fastened to a common shaft 52 and they all rotate together. The sun gear 40 drives one sub-planet, namely, sub-planet 49B.

Rotation of the sun gear 40 causes the two-fold rotation of the planets 49 indicated by arrows 56 and 58: (1) each planet rotates about its own axis 57 as indicated by arrow 56, and (2) also orbits about centerline 63 as indicated by arrow 58. One cause of the orbiting is the engagement of sub-planet 49C with fixed ring gear 59, which is fixed with respect to the propeller blade 9, as indicated by ground symbol 65 and connecting line 66. Under the assumption of non-rotation (of the propeller as a whole) made above, the fixed ring gear 59 does not rotate, and so rotation of the planet 49 (caused by sun 40) requires the planet 49 to orbit within the fixed ring gear 59, in direction 58.

The rotation of the planets 49 causes the movable ring gears 68 and 70 to rotate opposite relative to each other, as indicated by arrows 72 and 74, but at the same speed. The opposite relative rotation occurs because the gear ratios between each ring gear and its sub-planet (i.e., ring 68/sub-planet 49A and ring 70/sub-planet 49B) are different. (Greater detail concerning the causes of this opposite relative rotation is given in the section entitled "Technical Considerations," located at the end of the Specification.) When planets 49 stop rotating, the opposite relative rotation terminates, and pitch becomes fixed.

Therefore, it has been shown that rotation of the sun gear 40 induces a change of pitch in blade 9, when the propeller is non-rotating. The rotating case will now be considered.

Rotating Case

If the propeller rotates in direction 58 in FIG. 3 and there is no pitch change occurring, all components rotate about centerline 63 in the same direction and at the same speed. That is, both movable ring gears 68 and 70 and sun gear 40 rotate in the same direction and at the same speed as the blade 9: the movable ring gears and the sun gear are all synchronous.

The planets 49 are also rotating, but a distinction is now made between two types of planet rotation. Their rotation in direction 58 (or its opposite) is herein called "orbiting." Their rotation in direction 56 (i.e., about their own axes 57) will be called "rotation." During orbiting, the planets 49 may or may not rotate in direction 56. In the example just given, they are not rotating about their own axes because the movable ring gears and the sun gear are all synchronous.

Restated, planets 49 orbit in direction 58 along with the sun and ring gears but, since the sun gear 40 is rotating at synchronous speed with both movable ring gears 68 and 70, the planets 49, because they engage both the ring gears and the sun gear, do not rotate in direction 56 (or its opposite). The planets do not move with respect to either the sun gear 40 or the movable ring gears 68 and 70 at this time. The planets 49 are carried along with the sun and movable ring gears as though the planets 49 were welded to the sun or the ring gears.

For pitch change to occur, the rotating sun gear 40 must either accelerate or decelerate to a different speed. While rotating at the different speed (and also during the acceleration or deceleration), the sun gear 40 causes relative rotation of the movable ring gears 68 and 70 to occur, because of the principles discussed in "Technical Considerations," located at the end of the Specification. Further, if the sun accelerates to a higher speed, one type of relative rotation occurs (e.g., movable ring gear 68 may move faster than movable ring gear 70), while if the sun decelerates to a lower speed, the opposite type occurs (e.g., gear 68 moves slower than gear 70). Therefore, a higher speed of sun 40 causes pitch to change in one direction, while a lower speed causes pitch to change in the opposite direction.

As pitch approaches the desired value, the speed of the sun 40 returns to synchronicity with the movable ring gears 68 and 70, at which time pitch becomes constant, until another acceleration or deceleration of the sun gear 40 occurs. The particular speed behavior of the sun gear 40 (e.g., rapid return to synchronicity or a gradual return, or other behavior) is determined by the pitch control system, and is not a part of the present invention.

Both movable ring gears 68 and 70 rotate in the same direction in an absolute sense and do not rotate relative to each other, in the absence of pitch change. However, when pitch change occurs, one ring gear speeds up, while the other slows down. Therefore, even though the ring gears rotate in the same absolute direction, one ring gear rotates opposite relative to the other, because of the acceleration or deceleration. This relative opposite rotation, which occurs while both are nevertheless rotating in the same direction, can be called differential rotation: the ring gears are rotating at different speeds in the same direction. This discussion will now consider a different form of the invention.

FIGS. 4–6

A slightly different form of the invention from that shown in FIG. 3 will now be described with reference to FIGS. 4, 5 and 6. In these Figures, components which are analogous to those in FIG. 3 are labelled with identical numbers. For example, bevel blade gear 62 in FIG. 3 is analogous to bevel gear 62 in FIGS. 4–6.

Figure 4:
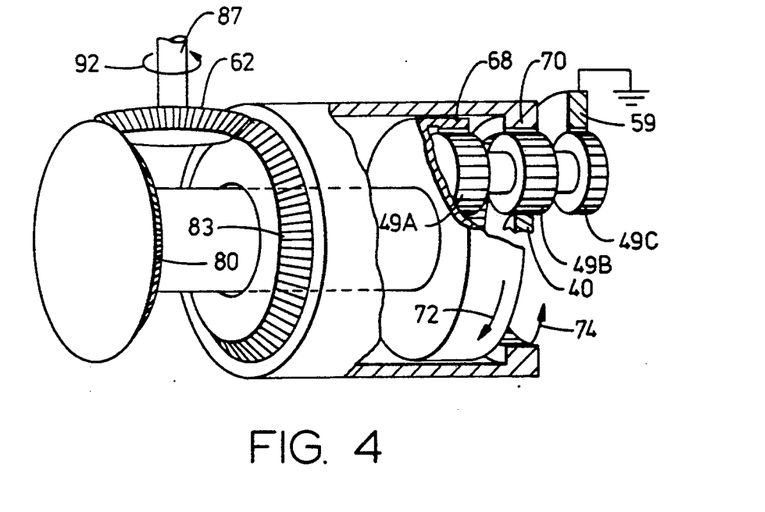
FIG. 4 shows another form of the invention.
Figure 5:
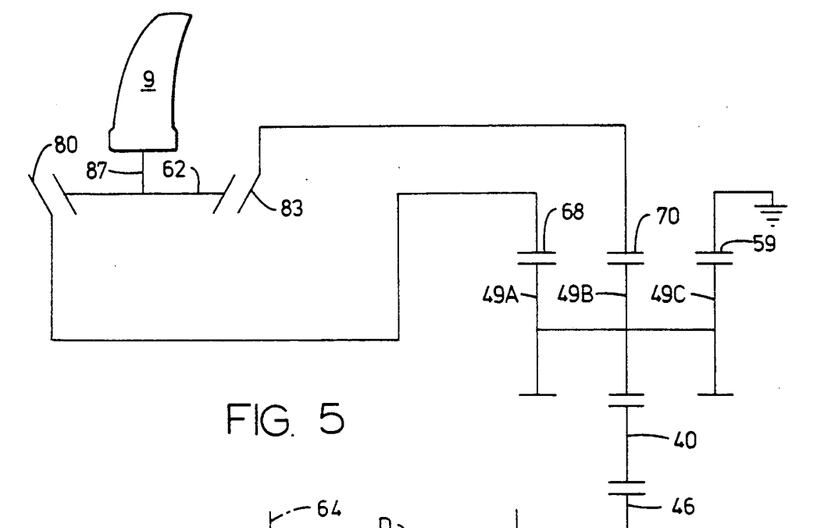
FIG. 5 is a schematic drawing of the form of the invention in FIG. 4.
Figure 6:
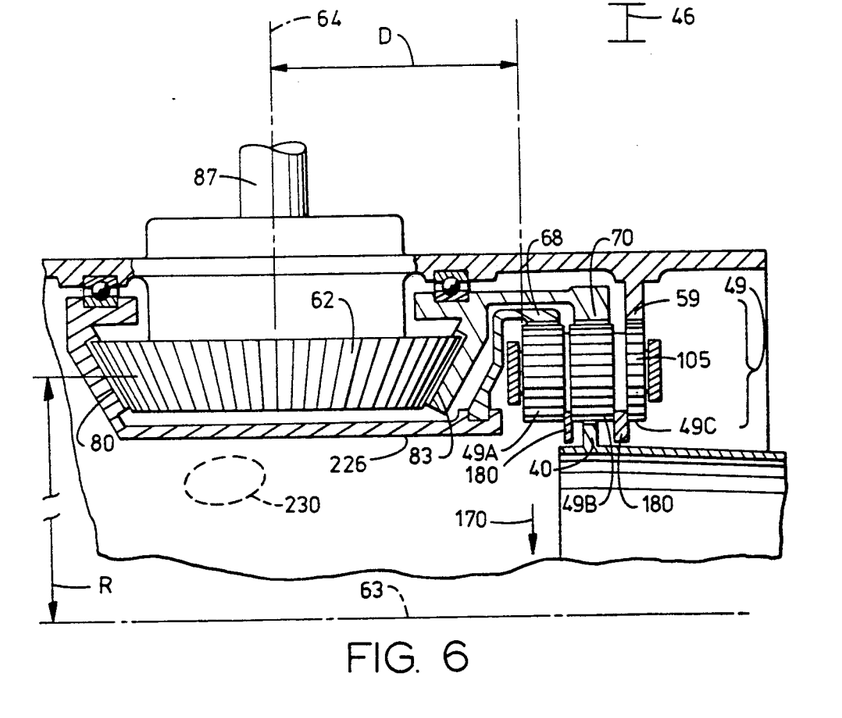
FIG. 6 is a cross-sectional view of the invention of FIG. 4.

The main difference between the invention of FIGS. 4–6 and that shown in FIG. 3 is that the movable ring gears 68 and 70 are not positioned radially inward of their bevel ring gears 80 and 83 as shown in FIG. 3. Instead, in FIG. 6, the movable ring gears are located at approximately the same radius R from the propeller centerline 63 as the bevel gear 62. Further, they are displaced axially by approximately distance D from the blade bevel gear axis 64. The configuration of FIG. 6 provides greater usable space in the engine, as explained at the end of the Specification.

The operation of the apparatus of FIGS. 4–6 is similar to that of FIG. 3. Sun gear 40 drives planet gear 49, causing the differential rotation of movable ring gears 68 and 70 as indicated by arrows 72 and 74 in FIG. 4. The differential rotation of these ring gears causes bevel gears 80 and 83 to also rotate in relative opposite directions, thus rotating the blade bevel gear 62 as indicated by arrow 92. Details of a cage for planets 49 will now be discussed.

Cage for Planets

Figures 7, 10:
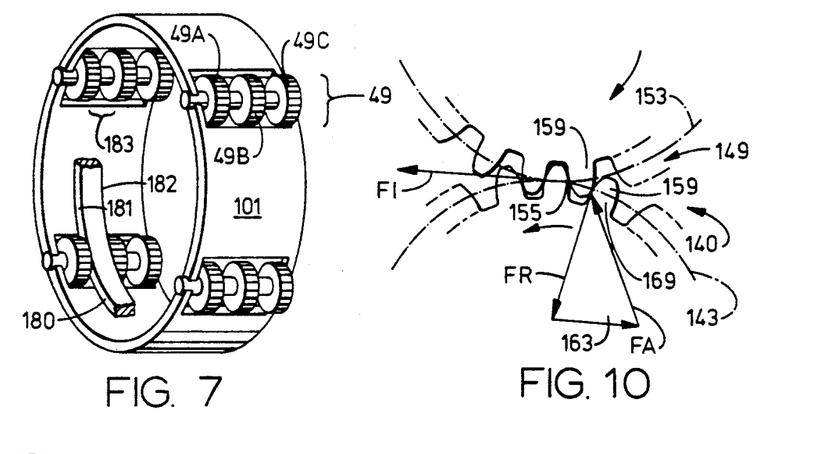
FIG. 7 illustrates a cage which carries planet gears.
FIG. 10 is a vector diagram showing the radially inward force which is applied to the planet gears.

The planet gears 49 in FIG. 3 are unconnected with each other; that is, they lack a cage. However, the planets 49 can be supported in a cage 101 as indicated in FIG. 7. The cage not only carries the centrifugal load of the planets 49, but also serves an important load-bearing purpose when a malfunction of one of the components in FIG. 6 occurs, as will now be explained.

During normal operation, the cage system is designed such that two conditions are fulfilled. First, the forces applied to each planet 49 by (1) the pair of movable ring gears 68 and 70 and (2) the fixed ring gear 59 cause no net moment about point 105 in FIG. 6. This lack of moment is explained as follows.

Planets Have Zero Moment

Figure 8A:
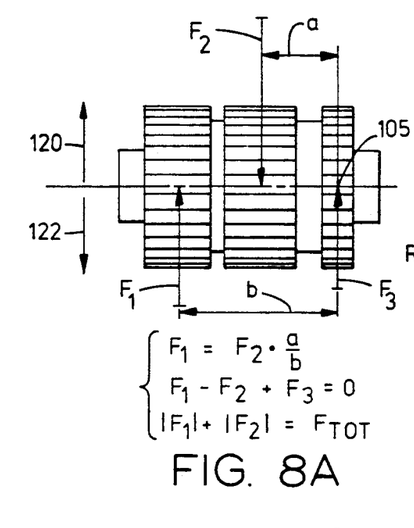
FIGS. 8A–8D illustrate the moment loads on the planet gears of FIGS. 3–6.

Movable ring gears 68 and 70 in FIG. 6 apply forces F1 and F2 to the planet 49 in FIG. 8A. Similarly, fixed ring gear 59 applies force F3. The system is designed such that these forces obey the following null-moment equation:

$$F1 = F2 \times a/b \qquad (1)$$

wherein F1 and F2 are the forces indicated in FIG. 8, and "a" and "b" are the dimensions indicated in that Figure. Satisfying this equation results in a zero net moment about point 105: no rotation about point 105 occurs.

Planets are in Static Equilibrium

As to the second condition, the system is designed to satisfy the following static equilibrium equation, so that no displacement of the planet 49 occurs, in the direction of either arrows 120 or 122:

$$F1 + F3 = F2 \qquad (2)$$

With both of the equations above satisfied, the planet remains stationary; it neither rotates about point 105 nor translates, and so the planets 49 apply no significant load to carrier 101 in FIG. 7. The carrier 101 is not loaded by planets 49.

Zero Moment and Static Equilibrium do not Exist If a Ring Gear Fails

Figure 8B:
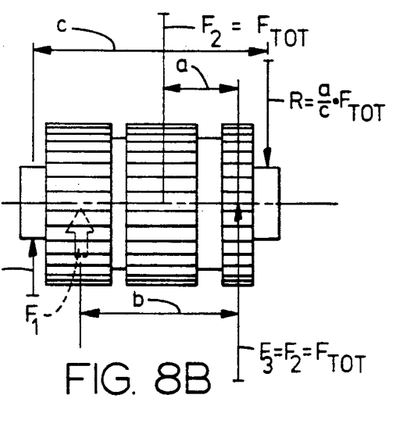
Figures 8C, 8D:
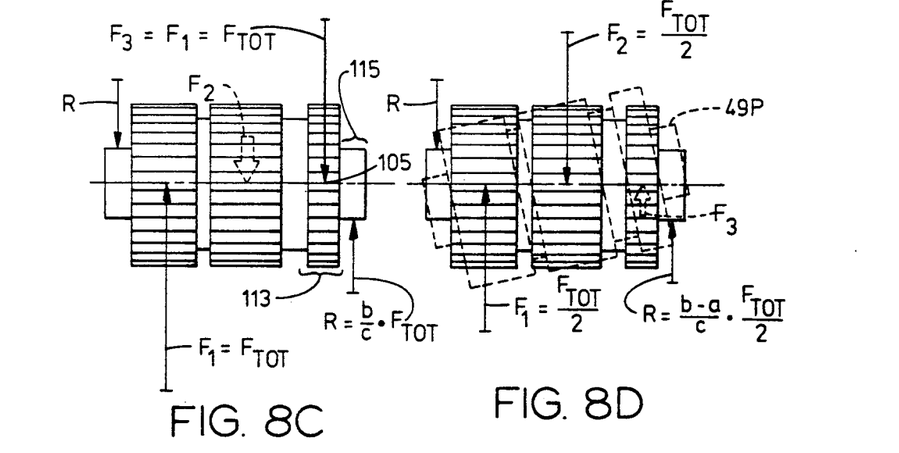

However, if a ring gear should fail (e.g., one of the movable ring gears 68 or 70 or the fixed ring gear 59 in FIG. 6), the force diagram of FIG. 8A no longer applies: instead, one of the diagrams of FIG. 8B–D becomes applicable. These Figures indicate, respectively, the forces acting when: (1) movable ring gear 68 breaks, (2) movable ring gear 70 breaks, or (3) fixed ring gear 59 breaks. Each of these breakage situations will now be explained.

FIG. 8B

As to the first situation, in FIG. 8B, force F1 is drawn in phantom in order to indicate the absence of that force, which occurs because of breakage of the movable ring gear 68. (A similar representation is given in FIGS. 8C and 8D for forces F2 and F3.) With force F1 absent, in order to satisfy the static equilibrium equation (2), above, force F2 must equal force F3. Further, in order to satisfy the null-moment equation (1), above, two new forces, each labeled R (for Reaction), are now applied to the planet 49 by the carrier 101 (not shown in FIG. 8). Each force R must equal $(a/c) \times Ftot$, wherein Ftot is the total force applied to both ring gears 68 and 70. Ftot equals the total of the magnitudes of F1 and F2, as stated in FIG. 8A, and, in FIG. 8B, Ftot equals F2 because F1 is absent.

FIG. 8C

In the second situation, in FIG. 8C, movable ring gear 70 fails. With force F2 absent, force F1 must now equal force F3 for static equilibrium of equation (2) to exist. Forces R, applied by the carrier, must each equal $(b/c) \times Ftot$, in order to provide zero moment about point 105.

FIG. 8D

In the third situation, the fixed ring gear 59 fails. With force F3 absent in FIG. 8D, the force carried by each movable ring gear 68 and 70 becomes equal to one-half of Ftot. This equality results from the characteristics of planetary gear systems. The reacting forces R of the carrier each equals $(b-a) \times Ftot/2c$.

Therefore, it has been shown that the carrier 101 in FIG. 7, which is non-load-bearing during normal operation, acquires a load indicated by the various forces R in FIGS. 8B–8D, depending upon which ring gear 59, 68, or 70 fails. The now-loaded carrier 101 maintains the planets in engagement with the ring gears 59, 68, and 70, thereby maintaining the pitch-change mechanism in a functional state. The carrier keeps the planets in mesh with the ring gears. Without the carrier 101, the planets could skew out of engagement by moving into phantom position 49P in FIG. 8D, thus disabling the pitch-change mechanism.

IMPORTANT FEATURES

Several important features of the invention are the following.

Figures 9, 11:
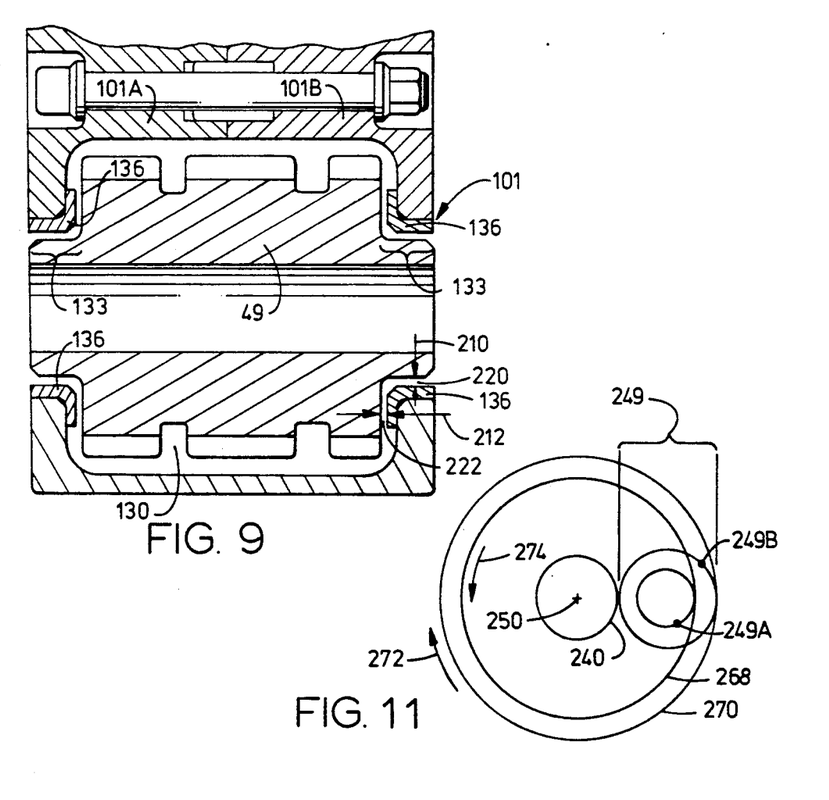
FIG. 9 is a detailed view of a cell 130 of the cage of FIG. 7.
FIG. 11 is a schematic showing two ring gears 268 and 270 being driven by a compound planet gear having sub-gears 249A and 249B.

One, the carrier 101 is formed in two mirror image parts 101A and 101B as indicated in FIG. 9. Each planet 49 is held captive within a cell 130. Trunnions 133 of each planet 49 make significant contact with bushings 136 only when a failure in a ring gear (59, 68, or 70 in FIG. 6) unbalances the moments on the planet 49, as shown in FIGS. 8B–8D, causing the planet to skew into phantom position 49P in FIG. 8D. The amount of skew is limited by bushings 136 in FIG. 9, which supply forces R in FIGS. 8B–8D when the trunnions 133 contact the bushings.

Two, the forces applied in FIGS. 8B–8D are components of the actual forces experienced by the planets 49, as will now be explained by reference to FIG. 10. In general, a typical gear 140 has associated with it an imaginary circle 143 called a pitch circle. Gears 140 and 149 can be viewed, for many purposes, as two wheels indicated by pitch circles 43 and 153 which contact each other and rotate without slipping.

Force F1 in FIG. 8A is roughly equivalent to the tangential force at contact point 155 on the two pitch circles in FIG. 10. (FIG. 10 shows a pair of spur gears, and not a planet-ring gear combination, for ease of illustration.)

However, the actual forces occurring between the planets 49 are not caused by the imaginary pitch circles, but by actual contact between gear teeth 159, and are not tangential. One actual force is FA, which has a component 163 in the direction of tangential force F1 and another component FR in a radial direction. This latter component FR tends to drive the planet 49 in the radially inward direction, namely direction 170 in FIG. 6.

The radial-moving tendency of planet gear 49 is opposed by annular ring bearings 180 in FIG. 7. The annular bearings 180 are rings which engage the planets in planet grooves 183. The rings 180 oppose forces such as FR in FIG. 10, and urge the planets radially outward, and into contact with the ring gears 59, 68, and 70 in FIG. 6.

The fit between rings 180 and the planets 49 may be sufficiently tight that rotation of the planets causes the rings 180 to rotate, as if the rings 180 were actually ring gears driven by the planets 49. In this case, most of the rubbing between the planets 49 and the rings 180 is eliminated, reducing friction. The remaining friction, which may occur between the side walls 181 and 182 of the ring 180 and the grooves 183, respectively, is not considered significant, for two reasons. (1) The components are constructed of hardened steels, which resist wear. (2) An oil film coats the components, and is provided by a lubrication system (not shown).

Three, as stated above, the fixed ring gear 59 in FIG. 3 does not move with respect to the propeller blade 9, as indicated by the ground symbol 65 and the connecting line 66. Thus, the fixed ring gear can be said to be in a fixed phase relationship with the propeller blade 9.

Four, the system shown in FIGS. 4–6 has three-fold redundancy. The first and second redundancies lie in the fact that if either movable ring gear 68 or 70 fails, then the planet carrier 101 in FIG. 7 adopts the load-carrying function of the failed ring gear and prevents the planetary gears 49 from becoming excessively skewed. The carrier largely restores the moment- and force balance shown in FIG. 8A by replacing the missing force (such as phantom force FI in FIG. 8B) of the failed gear by the forces R in FIGS. 8B-8D, allowing the remaining movable ring gear, together with the fixed ring gear, to change pitch.

The third redundancy lies in the fact that, if the fixed ring gear 59 fails, pitch can still change by using the two movable ring gears by themselves.

Viewed another way, three ring gears are used, while, strictly, only two are necessary. During normal operation, the three ring gears cooperate to reduce, or eliminate, the moment on the planets 49. If one ring gear breaks, a moment arises, but the two remaining ring gears can still change pitch.

Five, at least three different skew modes for the planets 49 can be designed into the system of FIG. 6. As stated above, when a ring gear breaks, forces R arise in FIGS. 8B-8D. These forces tend to rotate, or skew, the planet gear 49 into phantom position 49P in FIG. 8D. This rotation is resisted when the trunnion 133 strikes bushing 136 in FIG. 9. The sizes of clearances 210 and 212 between the planet gear 49 and the bushing 136 control the degree of skewing, and the sizes can be designed to achieve one of three different skew modes.

For the first mode, the clearance 210 during normal operation is very small, so that upon ring gear breakage only a slight skewing of the planets occurs and the other clearance 212 does not shrink to zero. The planets remain operable.

For the second mode, clearance 210 is larger, so that, upon ring gear breakage, skewing of the planet 49 is larger and sufficient to drive both clearances 210 and 212 to zero: the planet rubs the bushing 136 both at points 220 and 222. This larger skew is accompanied by larger friction, making the planet more difficult to rotate, but still operable. This friction can be sensed by a mechanism driving the planet gears in a manner known in the art in order to notify the pilot of the existence of the failure. For example, if the motor (not shown) driving pinion 46 in FIGS. 3 and 5 is hydraulic, a hydraulic pressure can be sensed. As a second example, if the motor is electric, the proper input current can be monitored.

For the third mode, the clearances 210 and 212 are so large and skewing is so great that friction, together with misalignment of the planets and the ring gears, jams the mechanism and inhibits further pitch change. Jamming is a fail-safe feature, because, in some circumstances, it is preferable to have a fixed, jammed pitch, rather than a variable, uncontrolled pitch. The third mode is unlike the situations discussed above because, with the third mode, pitch change is fully blocked, while, with the others, pitch change was possible.

Six, the cage 101 in FIG. 7 can be eliminated from the invention, in which case the cage does not provide balancing forces R in FIGS. 8B-8D. In this case, the planets 49 are allowed to dislocate and skew upon ring gear failure to the extent that pitch becomes jammed and the system becomes unbalanced, which is a situation that will immediately become known to the pilot through rpm control problems.

Seven, the bearing rings 180 in FIG. 6 serve not only to drive the planets into contact with the ring gears, but also to center the planets about the engine center line 63 in FIG. 6 when a failure of a ring gear occurs.

Eight, the configuration of FIG. 6 frees space in region 230 for occupancy by other engine parts which are not shown. The analogous space in FIG. 3 is not free for such occupancy. In the case of FIG. 6, the planets 49 are located radially outside the shell 226, which carries bevel ring gear 80.

Nine, the preceding discussion has presumed a fixed ring gear 59. However, it is conceivable that the three ring gears and the three sub-planets can be toothed such that the "fixed" ring gear is not fixed, but rotates. Nevertheless, the fixed ring gear still can provide the moment balance and redundancy discussed above.

Technical Considerations

Figure 12:
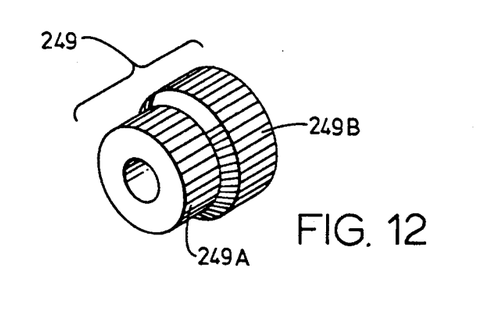
FIG. 12 shows a compound planet gear.

FIG. 11 illustrates a compound planet gear 249, also shown in FIG. 12, having a large diameter sub-planet 249B attached to a smaller diameter sub-planet 249A. The compound planet 249 is driven by a sun gear 240 and both the compound planet 249 and the sun gear 240 are free to rotate about center 250.

A pair of inner and outer ring gears 268 and 270, the latter being larger in diameter than the former, engage the compound gear 249. The ring gears 268 and 270 correspond to movable ring gears 68 and 70 in FIG. 6. Compound planet gear 249 in FIG. 11 corresponds to planet 49 in FIG. 6, and sun gear 240 in FIG. 11 corresponds to sun gear 40 in FIG. 6.

When sun gear 240 in FIG. 11 rotates, the compound planet 249 rotates and causes relative opposite rotation of the ring gears 268 and 270, as indicated by arrows 274 and 272. The relative rotation can be explained with reference to FIG. 13.

Figure 13:
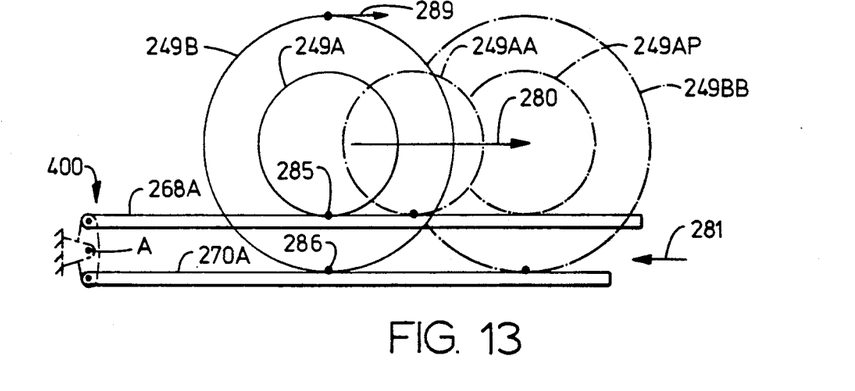
FIG. 13 shows how rolling of the compound planet causes relative motion of the ring gears 268A and 270A.

In FIG. 13, ring gears 268 and 270 in FIG. 11 are shown as flat surfaces 268A and 270A. That is, in FIG. 13, the ring gears are shown as having infinite diameters. Let it first be assumed that sub-planets 249A and 249B are not connected as shown in FIG. 12, but can rotate independently. Let it also be assumed that surfaces 268A and 270A in FIG. 13 do not move. Under these assumptions, if both sub-planets rotate ¼ revolution to the right (i.e., in the direction of arrow 280 in FIG. 13), then they will reach the phantom positions 249AA and 249BB. However, since they are fastened together, contrary to the assumption, the small sub-planet 249A is forced to occupy phantom position 249AP.

Since there is no slippage between sub-planets and ring gears, the ring gear 268A is forced to move to the right with respect to surface 270A, contrary to the other assumption. That is, ring gears 268A and 270A move in opposite directions with respect to each other: small ring gear 268A sees large ring gear 270A moving in the direction of arrow 281 with respect to it.

This relative, differential motion can be explained by phantom linkage 400. Phantom linkage 400 does not actually exist, but the gear trains in FIGS. 3 through 6 cause gear-surfaces 268A and 270A in FIG. 13 to behave as though linkage 400 actually does exist. It is significant that axis A is, in effect, grounded, and forces surfaces 268A and 270A to move in opposite directions at the same speed.

Figure 14:
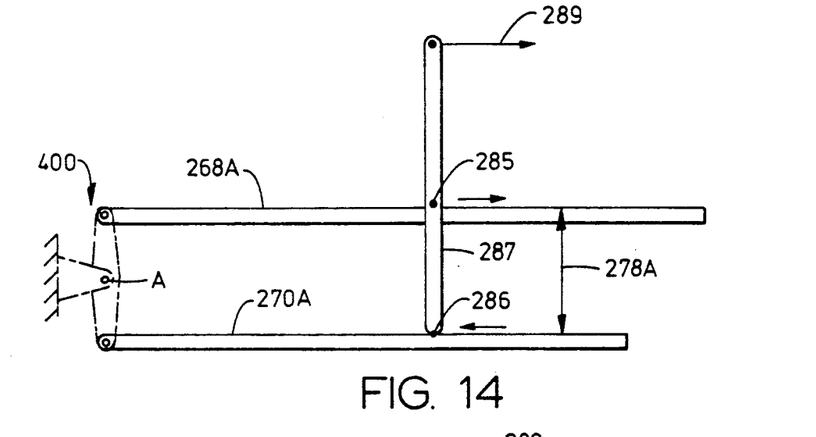
FIGS. 14 and 15 illustrate how the gear system of FIG. 13 can produce a mechanical advantage.

This relative, differential, motion can be explained in a different manner by reference to FIG. 14. Tangent points 285 and 286 in FIG. 13 are shown in FIG. 14 and are viewed as pivot points at which a lever 287 is fastened to the surfaces 268A and 270A. If the lever is pulled to the right by force 289, surface 268A is driven to the right with respect to surface 270A.

The preceding discussion has explained that motion of the compound planet 49 in FIG. 6 induces a relative opposite rotation of ring gears 68 and 70. In addition, as will now be explained in connection with FIG. 15, a mechanical advantage can be obtained by planet 49 in FIG. 6 over the ring gears 68 and 70.

Figure 15:
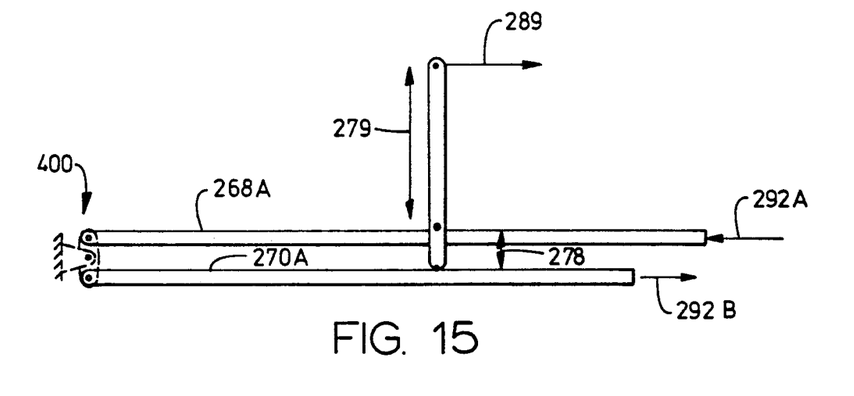
Figure 15A:
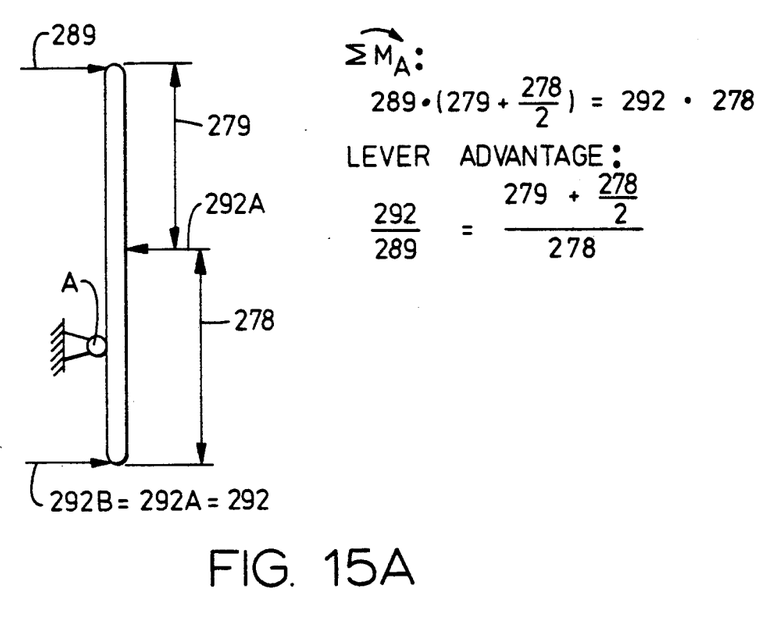
FIG. 15A illustrates a computation of the mechanical advantage.

FIG. 15 shows a different separation 278 between the flat surfaces 268A and 270A, as compared with the separation 278A in FIG. 14. In FIG. 15, force 289 has a mechanical advantage over the resisting forces 292A and 292B, and the magnitude of the advantage is the ratio of [distance 279+(distance 278)/2]/(distance 278). The computation of the ratio is shown in FIG. 15A.

Restated, the ratio shows that when distance 278 becomes smaller (i.e., the closer are ring gears 68 and 70 in FIG. 6 to having the same diameter), the mechanical advantage of sun gear 40 (which is analogous to force 289 in FIG. 15) becomes larger.

Therefore, it has been shown that when ring gears 68 and 70 in FIG. 6 have different tooth numbers, as do sub-planets 49A and 49B, rotation of the sub-planets causes opposite relative rotation of the movable ring gears at equal speeds. Further, the gears can be toothed such that the planets 49 have a mechanical advantage over the ring gears 68 and 70, and thus over the propeller blade.

Numerous substitutions and modifications can be undertaken without departing from the true spirit and scope of the invention as defined in the following claims. What is desired to be secured by Letters Patent is the invention defined as follows.

What is claimed is:

1. A pitch-change mechanism for an aircraft propeller, comprising:
   a) a planetary gear system including a sun gear, a plurality of planet gears and three ring gears, said sun gear driving said plurality of planet gears, said planet gears engage each of said ring gears, said ring gears being linked to a plurality of blades of said propeller and a planet gear carrier associated with said planet gears wherein:
   (i) two of said ring gears are movable with respect to the propeller blades,
   (ii) one of said ring gears is fixed with respect to the propeller blades and said fixed ring gear reacts an overturning moment on said planet gears,
   (iii) relative rotation between any pair of ring gears causes a change in blade pitch,
   (iv) said planet gear carrier carries no noncentrifugal load during normal operation,
   (v) said planet gear carrier is responsive to a malfunction of one of said ring gears, said planet gear carrier becomes loaded and applies compensating loads to said planet gears in order to maintain said planet gears in mesh with at least the remaining two of said ring gears,
   (vi) said planetary gear system includes means for providing radial support for said planet gears without the use of rolling element bearings; and
   b) means for driving the sun gear.

2. The pitch-change mechanism of claim 1, further comprising: means for preventing variable, uncontrolled pitch change and providing a fixed and jammed pitch when one of said ring gears reduces load on said planet gears, thereby creating a fail-safe structure.

3. The pitch-change mechanism of claim 2, wherein: all of said ring gears form three redundant pairs which together change pitch during normal operation and in which a single pair can change pitch if one of said ring gears fails.

4. A pitch-change mechanism for an aircraft propeller, comprising:
   a) a planetary gear system including a sun gear, planet gears, and ring gears, said sun gear driving said planet gears, said planet gears including first, second, and third sub-planet gears, said first, second, and third sub-planet gears engaging respectively first, second, and third said ring gears, wherein
   (i) said first and second ring gears are movable with respect to propeller blades and are linked to the propeller blades,
   (ii) said third ring gear is fixed with respect to the blades,
   (iii) said first and second sub planet gears contain different numbers of gear teeth,
   (iv) said planet gears and said ring gears are toothed such that during normal operation, rotation of the planet gears causes relative rotation between
   A) the first and second ring gears,
   B) the second and third ring gears,
   C) the first and third ring gears, and
   gear teeth loads created by said first and second movable ring gears are reacted by said third fixed ring gear, and
   v) during malfunction of one of the ring gears, rotation of the planet gears causes relative rotation between the other two ring gears,
   vi) said planetary gear system further comprises a planet gear carrier which provides load carrying redundancy during said malfunction, said planet gear carrier is supported without the use of bearings, and
   vii) the ring gears and the sun gear cause no net moment in said planet gears during normal operation; and
   b) means coupled between said first and second movable ring gears and the propeller blades for converting motion of either ring gear into pitch change of the blades, said first, second, and third ring gears form three redundant pairs which together change pitch during normal operation and in which a single pair can change pitch during said malfunction; and
   c) means for driving the sun gear.

5. The pitch-change mechanism of claim 4, further comprising:
   a) a plurality of blade gears each including forward and aft sides, each of said blade gears driving a propeller blade;
   b) said first and second ring gears driving said blade gears, each being capable of changing pitch if the other fails, said first ring gear being linked to said blade gears forward side, said second ring gear being linked to said blade gears aft side; and
   c) means for applying a radially outward force to said planet gears.

6. The pitch-change mechanism of claim 4, further comprising:
   a) a plurality of bushings fixedly attached to said planet gear carrier and each including a first surface extending in an axial direction and a second surface extending radially;

b) an axial surface on each of said planet gears adjacent to said bushing first surface defining a radial clearance therebetween;

c) a radial surface on each of said planet gears adjacent to said bushing second surface defining an axial clearance therebetween; and d) a system for limiting skew of said planet gears to a predetermined amount, responsive to said malfunction, which includes (i) said planet gear carrier which receives no non-centrifugal load from said planet gears in the absence of said malfunction, (ii) said radial clearance, and (iii) said axial clearance.

* * * * *